US010140173B2

(12) United States Patent
Kim et al.

(10) Patent No.: US 10,140,173 B2
(45) Date of Patent: *Nov. 27, 2018

(54) METHOD FOR ALLOCATING RESOURCES IN WIRELESS COMMUNICATION SYSTEM AND SYSTEM THEREOF

(71) Applicant: Samsung Electronics Co., Ltd., Suwon-si, Gyeonggi-do (KR)

(72) Inventors: Soeng Hun Kim, Suwon-si (KR); Gert-Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 838 days.

This patent is subject to a terminal disclaimer.

(21) Appl. No.: 14/165,062

(22) Filed: Jan. 27, 2014

(65) Prior Publication Data

US 2014/0157075 A1 Jun. 5, 2014

Related U.S. Application Data

(63) Continuation of application No. 12/991,002, filed as application No. PCT/KR2009/002321 on Apr. 30, 2009, now Pat. No. 8,675,578.

(30) Foreign Application Priority Data

May 6, 2008 (KR) .................. 10-2008-0041683

(51) Int. Cl.
*H03M 13/00* (2006.01)
*G06F 11/10* (2006.01)
(Continued)

(52) U.S. Cl.
CPC ........ *G06F 11/1004* (2013.01); *H04L 1/0025* (2013.01); *H04L 1/1887* (2013.01)

(58) Field of Classification Search
CPC ... H03M 13/09; H03M 13/091; H04L 1/0061; H04L 1/0057; H04L 1/0045; H04L 1/1887; H04L 1/0025; G06F 11/1004
(Continued)

(56) References Cited

U.S. PATENT DOCUMENTS 7,738,460 B2 * 6/2010 Lansing ............ H04N 7/17318
370/392
2006/0239334 A1 10/2006 Kwon et al.
(Continued)

FOREIGN PATENT DOCUMENTS

EP 3030029 A1 * 6/2016 .......... H04W 72/042
KR 10-2007-0094443 A 9/2007
(Continued)

*Primary Examiner* — Guy J Lamarre
*Assistant Examiner* — Enam Ahmed
(74) *Attorney, Agent, or Firm* — Jefferson IP Law, LLP

(57) ABSTRACT

This invention relates to a method for allocating resources in a wireless communication system and a system thereof. The disclosed method comprises steps for: allowing a user's terminal to receive information about the wireless transmission resources among semi-permanent transmission resources; performing CRC-calculation by receiving a message about the allocation of the semi-permanent transmission resources based on the received information; verifying the validity of the message by comparing the information about the wireless resources indicated in the received message with the received information about the wireless transmission resources; and receiving data as the transmission resources indicated in the message if there is no error in the verification.

10 Claims, 8 Drawing Sheets

(51) Int. Cl.
*H04L 1/00* (2006.01)
*H04L 1/18* (2006.01)

(58) Field of Classification Search
USPC .......................................................... 714/758
See application file for complete search history.

(56) References Cited

U.S. PATENT DOCUMENTS

| | | | |
|---|---|---|---|
| 2007/0256002 A1* | 11/2007 | Franke | G06F 11/1068 |
| | | | 714/785 |
| 2008/0232284 A1* | 9/2008 | Dalsgaard | H04W 72/042 |
| | | | 370/310 |
| 2009/0055709 A1* | 2/2009 | Anderson | H04L 1/0061 |
| | | | 714/758 |
| 2009/0245194 A1 | 10/2009 | Damnjanovic et al. | |
| 2009/0257385 A1* | 10/2009 | Meylan | H04L 1/0045 |
| | | | 370/329 |
| 2010/0070815 A1* | 3/2010 | Papasakellariou | H04L 1/0061 |
| | | | 714/748 |
| 2010/0085927 A1* | 4/2010 | Torsner | H04L 1/1822 |
| | | | 370/329 |
| 2011/0096725 A1 | 4/2011 | Chun et al. | |

FOREIGN PATENT DOCUMENTS

| | | | | |
|---|---|---|---|---|
| KR | 10-2008-0011868 A | 11/2008 | | |
| WO | 2007/107821 A2 | 9/2007 | | |
| WO | 2007/108602 A1 | 9/2007 | | |
| WO | WO 2009117578 A1 * | 9/2009 | ........... | H04L 1/0045 |

\* cited by examiner a)

b)

METHOD FOR ALLOCATING RESOURCES
IN WIRELESS COMMUNICATION SYSTEM
AND SYSTEM THEREOF

CROSS-REFERENCE TO RELATED
APPLICATION(S)

This application is a continuation of U.S. application Ser. No. 12/991,002, which was the National Stage of International Application No. PCT/KR2009/002321, filed on Apr. 30, 2009, which claimed the benefit of a Korean patent application filed on May 6, 2008 in the Korean Intellectual Property Office and assigned Serial number 10-2008-0041683, the entire disclosure of which is hereby incorporated by reference.

TECHNICAL FIELD

The present invention relates to a wireless communication system and resource allocation method of the wireless communication system and, in particular, to a wireless communication system and resource allocation method thereof for avoiding resource allocation error.

BACKGROUND

Universal Mobile Telecommunication Service (UMTS) system is a $3^{rd}$ Generation asynchronous mobile communication system based on Global System for Mobile Communication (GSM) and General Packet Radio Services (GPRS) and using Wideband Code division Multiple Access (WCDMA).

The $3^{rd}$ Generation Partnership Project (3GPP), in charge of standardization of UMTS, is now working on Long Term Evolution (LTE) as the next generation mobile communication system. LTE is a technology for realizing 100 Mbps high-speed packet based-communication and is scheduled to be commercialized by 2010. In order to meet the requirement, various techniques discussed. Some of these techniques can be to reduce a number of nodes on the communication channel and to arrange wireless protocols close to wireless channels.

In case of LTE in which communication is performed with the resources allocated based on the per-packet scheduling, frequent transmission of control information such as scheduling request and resource allocation information causes traffic overload. In order to solve this problem, Semi-Persistent Scheduling (SPS) is adopted.

In the SPS, the base station notifies a user terminal of the allocated SPS resource and size of MAC PDU to be transmitted on the SPS resource. Upon receipt of the information on the SPS resource allocation, the user terminal can transmit MAC PDUs on the SPS resource without exchange of additional control signals. In order to check the SPS resource allocated itself, the user terminal performs Cyclic Redundancy Checking (CRC). If the CRC fails, the user terminal may misjudge the allocation of SPS resource even though no SPS resource has been allocated. In this case, the user terminal transmits the data continuously on the misjudged SPS resource, resulting in waste of transmission resource allocation. There is therefore a need to develop of an efficient resource allocation method that is capable of reducing the waste of transmission resource.

SUMMARY

In order to solve the problems of the prior arts, the present invention provides a wireless communication system and resource allocation method of the wireless communication that is capable of verifying the validity of the resource allocation message for the semi-persistent transmission resource by correcting error in CRC result.

In accordance with an aspect of the present invention, a resource allocation method of a user terminal includes performing Cyclic Redundancy Checking (CRC) operation on a semi-persistent transmission resource allocation message received; verifying, when the CRC operation succeeds, validity of the semi-persistent transmission resource allocation message by comparing transmission resource information contained in the semi-persistent transmission resource allocation message with a previously received radio transmission resource information; and using, when the validity of the semi-persistent transmission resource allocation message is verified, the transmission resource indicated by the semi-persistent transmission resource allocation message semi-persistently.

Preferably, verifying validity of the semi-persistent transmission resource allocation message comprises determining whether a MAC PDU size indicated in the semi-persistent transmission resource allocation message is equal to one of MAC PDU sizes contained in the previously received radio transmission resource information.

Preferably, the indicated MAC PDU size is a value obtained from a number of resource blocks, a modulation scheme, a channel coding rate, and a number of bits per resource block that are acquired from the semi-persistent transmission resource allocation message.

Preferably, verifying validity of the semi-persistent transmission resource allocation message comprises determining whether a number of resource blocks indicated by the semi-persistent transmission resource allocation message is less than a maximum number of resource blocks of the previously received radio transmission resource information.

Preferably, the resource allocation method further includes discarding, when the CRC operation fails, the semi-persistent transmission resource allocation message.

Preferably, verifying validity of the semi-persistent transmission resource allocation message includes transmitting an HARQ message to a first packet transmitted on the transmission resource indicated by the semi-persistent transmission resource allocation message; and receiving at least one of an HARQ ACK in response to the HARQ message to the first packet and a retransmission resource allocation message in response to the HARQ message.

Preferably, the resource allocation method further includes using, when at least one of an HARQ ACK in response to the HARQ message and retransmission resource allocation message in response to the HARQ message is received, the transmission resource indicated by the semi-persistent transmission resource allocation message.

Preferably, the resource allocation method further includes discarding, when none of an HARQ ACK in response to the HARQ message and retransmission resource allocation message in response to the HARQ message is received, the semi-persistent transmission resource allocation message.

In accordance with another aspect of the present invention, a user terminal which is allocated transmission resource by means of a semi-persistent transmission resource allocation message includes a reception unit which receives the semi-persistent transmission resource allocation message, compares, when no error is in CRC operation result, transmission resource information contained in the semi-persistent transmission resource allocation message with a previously received radio transmission resource information to verify validity of the semi-persistent transmission resource allocation message, and uses, when the validity of the semi-persistent transmission resource allocation message is verified, the transmission resource indicated by the semi-persistent transmission resource allocation message semi-persistently.

Preferably, the reception unit verifies the validity of the semi-persistent transmission resource allocation message by comparing a MAC PDU size indicated in the semi-persistent transmission resource allocation message with MAC PDU sizes contained in the previously received radio transmission resource information.

Preferably, the reception unit calculates the MAC PDU size based on at least one of a number of resource blocks, a modulation scheme, a channel coding rate, and a number of bits per resource block that are acquired from the semi-persistent transmission resource allocation message Preferably, the reception unit verifies the CRC operation result depending on whether a number of resource blocks indicated by the semi-persistent transmission resource allocation message is less than a maximum number of resource blocks of the previously received radio transmission resource information.

Preferably, the reception unit discards, if an error is in CRC operation result, the semi-persistent transmission resource allocation message.

Preferably, the user terminal further includes a radio resource control unit which receives the radio transmission resource information including at least one of available MAC PDU sizes and maximum number of resource blocks from a base station.

Preferably, the reception unit verifies the validity of the semi-persistent transmission resource allocation message, after transmitting an HARQ message to a first packet transmitted on the transmission resource indicated by the semi-persistent transmission resource allocation message, depending on whether at least one of an HARQ ACK in response to the HARQ message to the first packet and a retransmission resource allocation message in response to the HARQ message.

Preferably, the reception unit uses, when at least one of an HARQ ACK in response to the HARQ message and retransmission resource allocation message in response to the HARQ message is received, the transmission resource indicated by the semi-persistent transmission resource allocation message.

Preferably, the reception unit discards, when none of an HARQ ACK in response to the HARQ message and retransmission resource allocation message in response to the HARQ message is received, the semi-persistent transmission resource allocation message.

As described above, the resource allocation method of the present invention is capable of verify the validity of the semi-persistent transmission resource allocation message even when CRC error occurs, resulting in reduction of waste of semi-persistent transmission resource. The present invention is advantageous to save radio communication resource. Accordingly, it is possible to improve the performance of the radio communication system.

DETAILED DESCRIPTION

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Figure 1:
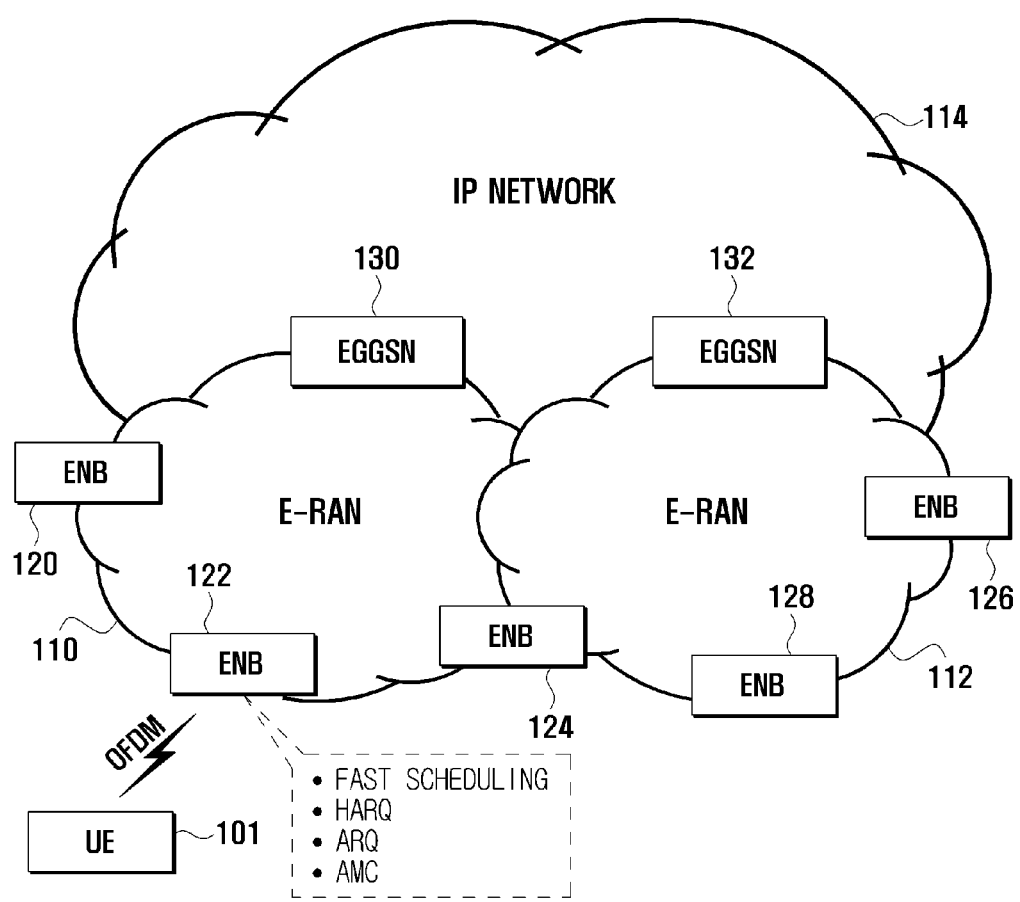
FIG. 1 is a schematic diagram illustrating a configuration of the wireless communication system according to an embodiment of the present invention.

A description is made of the wireless communication system according to an exemplary embodiment of the present invention. FIG. 1 is a schematic diagram illustrating a configuration of the wireless communication system according to an embodiment of the present invention.

In the wireless communication system according to an embodiment of the present invention as shown in FIG. FIG. 1, an Evolved Radio Access Networks (hereinafter, called E-RAN) (110 and 112) is implemented as a 3-node structure including Evolved Node Bs (ENB) (120, 122, 124, 126, and 128) and Evolved Gateway GPRS Serving Nodes (EGGSN) (130 and 132). Here, GPRS is the abbreviation of General Packet Radio Service.

A User Equipment (UE) (101) accesses the Internet Protocol (IP) network (114) via the E-RAN (110 and 112). The ENB (120, 122, 124, 126, and 128) corresponds to the legacy Node B and allows the connection of the UE 100. Unlike the legacy Node B, ENB (120, 122, 124, 126, and 128) is in charge of more complicated functions. The Next generation wireless communication system serves such that the all kinds of user traffic including real time services such as Voice over IP (VoIP) are transmitted on the shared channel. For this reason, the UE (101) needs to be scheduled based on the status information, and the ENB (120, 122, 124, 126, and 128) is responsible for the scheduling. An ENB (120, 122, 124, 126, or 128) can manage a plurality of cells. In order to secure the maximum data rate of 100 Mbps, the wireless communication system employs Orthogonal Frequency Division Multiplexing (OFDM) as wireless access technology over the bandwidth of 20 MHz. The wireless communication system can employ the Adaptive Modulation and Coding (AMC) technique for determining the modulation scheme and channel coding rate based on the channel condition of the UE 101.

The E-RAN (110 and 112) including the ENBs (120, 122, 124, 126, and 128) is called base stations and the UE 101 is called user terminal (100) hereinafter.

Figure 2:
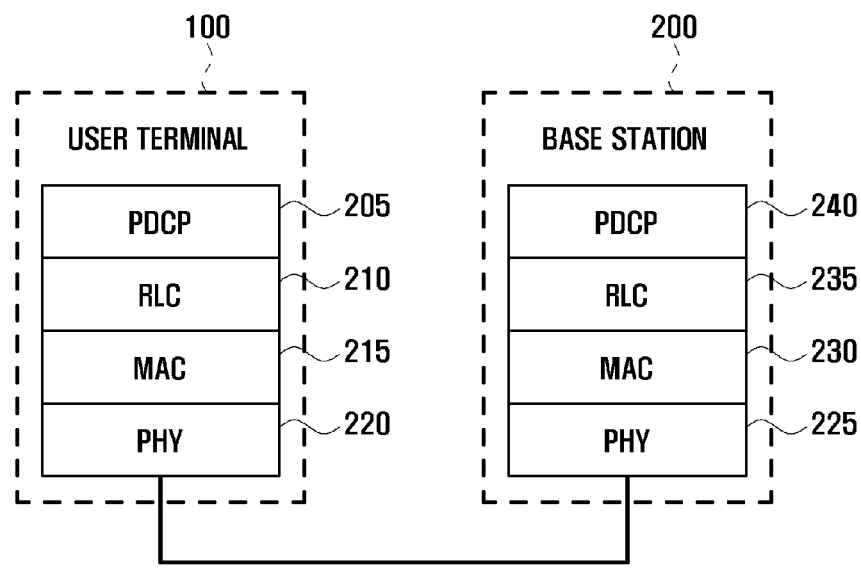
FIG. 2 is a diagram illustrating a layered structure of protocol stack of the wireless communication system according to an exemplary embodiment of the present invention.

Next, a description is made of the layered structure of protocol stack of the wireless communication system according to an embodiment of the present invention. FIG. 2 is a diagram illustrating a layered structure of protocol stack of the wireless communication system according to an exemplary embodiment of the present invention.

Referring to FIG. 2, the protocol stack includes a Packet Data Convergence Protocol (PDCP) layer (205, 240), a Radio Link Control (RLC) layer (210, 235), a Medium Access Control (MAC) layer, and a Physical (PHY) layer (220 and 225).

The PDCP layer (205, 240) is responsible for IP header compression/decompression. The RLC layer (210, 235) is responsible for Automatic Repeat Request (ARQ) with reconstruction of PDCP PDU (Protocol Data Unit, which is a packet output by a specific protocol layer device) in appropriate size.

The MAC layer (215, 230) is connected with a plurality of RLC layer devices within the user terminal. The mace layer (215 and 230) multiplexes the RLC PDUs output by the RLC layer devices into MAC PDU and demultiplexes the MAC PDU into RLC PDUs.

The PHY layer (220, 225) performs channel coding and modulation on the upper layer data into OFDM symbols to be transmitted over radio channel and performs demodulation and channel decoding on the OFDM symbols received over the radio channel and transfers the decoded data to the upper layer.

In the wireless communication system according to an embodiment of the present invention, all the services are provided in packet-based manner. For example, the voice call service can be provided in packet-switched manner rather than circuit-switched manner. Particularly, the VoIP traffic has a characteristic in that small packet is generated periodically. For example, in the VoIP service operating in 12.2 kbps AMR codec mode, the packet which is 35-byte long in size is generated every 20 msec. In order to transmit the VoIP packet with the normal scheduling, the scheduling request information and uplink transmission resource allocation information have to be transmitted whenever the packet is generated. For this reason, the base station 200 allocates semi-persistent resource to the user terminal 100. The message transmitted by the base station for allocating semi-persistent resource is called "semi-persistent transmission resource allocation message". Meanwhile, the user terminal 100 performs Cyclic Redundancy Check (CRC) for checking whether the received message is the semi-persistent transmission resource allocation message destined to itself. The CRC operation error may cause the user terminal to misjudge a transmission resource allocation message destined to another terminal as the semi-persistent resource destined itself. Such a message is called "misrecognized erroneous semi-persistent resource transmission resource allocation message" (hereinafter, called misrecognized erroneous message). The present invention is provided to check the misrecognized erroneous message by verifying the CRC operation result.

Figure 3:
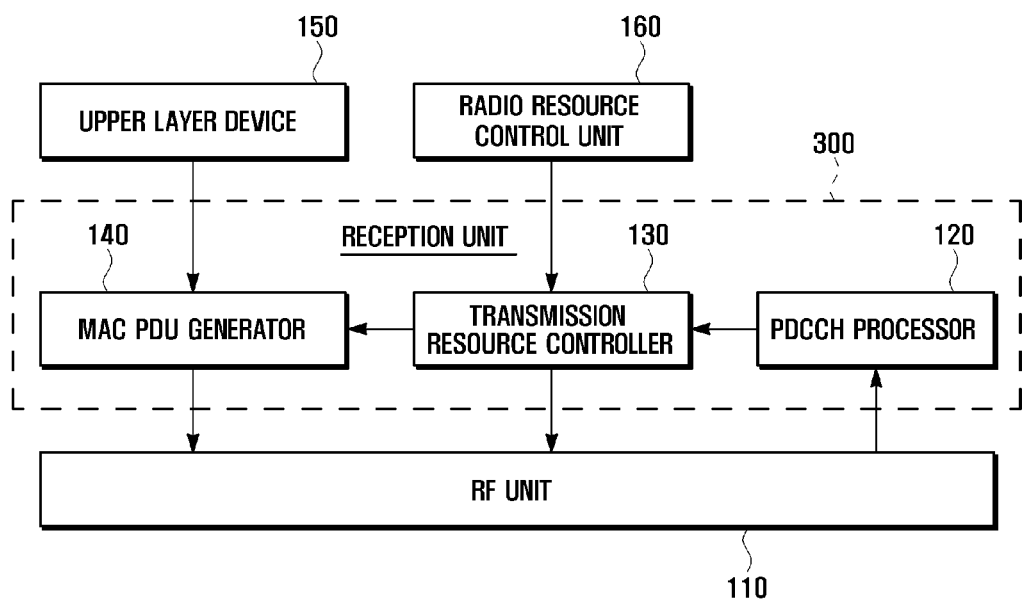
FIG. 3 is a block diagram illustrating a configuration of the user terminal according to an exemplary embodiment of the present invention.

A description is made of an internal structure of the user terminal 100 according to an exemplary embodiment of the present invention. FIG. 3 is a block diagram illustrating a configuration of the user terminal according to an exemplary embodiment of the present invention.

Referring to FIG. 3, the user terminal 100 includes a Radio Frequency (RF) unit 110, a reception unit 300, an upper layer device 150, and a radio resource control unit 160. Particularly, the reception unit 300 includes a PDCCH processor 120, a transmission resource controller 130, a MAC PDU generator 140, a radio resource controller 150, and upper layer device 160.

The RF unit 110 is responsible for communicating data over radio channels. Particularly, the RF unit 110 transmits/receives messages on Physical Downlink Control Channel (PDCCH). If a message is received over the PDCCH, the RF unit 110 decodes the message received on the PDCCH and transfers the decoded message to the PDCCH processor 120.

The PDCCH processor 120 performs masking on message decoded by the RF unit 110 with a Cell Radio Network Temporary Identity (C-RNTI) and CRC operation. The C-RNTI is an identifier that can be used to identify the semi-persistent resource allocation message. That is, the PDCCH processor 120 performs CRC operation and determines whether the message is destined to itself. The PDCCH processor 120 sends the transmission resource allocation message and semi-persistent transmission resource allocation message identified based on the CRC result, i.e. passed the CRC test, to the transmission resource controller 130.

The transmission resource controller 130 controls the RF unit 110 and the MAC PDU generator 140 such that the MAC PDU generated in size indicated by the resource allocated with the transmission resource allocation message sent by the PDCCH processor 120.

Particularly, the transmission resource controller 130 according to the first embodiment of the present invention is capable of verifying the misrecognized erroneous message received as a result of the erroneous CRC operation.

In more detail, the transmission resource controller 130 receives the information on the available MAC PDU size and maximum number of resource blocks from the radio resource control unit 160. Next, the transmission resource controller 130 determines whether the semi-persistent transmission resource allocation message from the PDCCH processor 120 is the misrecognized erroneous message. If it is determined that the semi-persistent transmission resource allocation message is not the misrecognized erroneous message, the transmission resource controller 130 controls the MAC PDU generator 140 and the RF unit 110 to transmit the MAC PDU generated in size indicated by the information received on the semi-persistent transmission resource. If it is determined that the semi-persistent transmission resource allocation message is the misrecognized erroneous message, the transmission resource controller 130 discards the message and ignores the information carried by the message.

According to the second embodiment of the present invention, the transmission resource controller 130 receives the semi-persistent transmission resource allocation message and performs HARQ retransmission using the transmission resource indicated by the received semi-persistent transmission resource allocation message. If an HARQ response message and a retransmission transmission resource allocation message is received, the transmission resource controller 130 transmits and/or receives data on the transmission resource indicated by the received semi-persistent transmission resource allocation message.

The MAC PDU generator 140 generates MAC PDUs with the data provided by the upper layer device 150 and transfers the MAC PDUs to the RF unit 110. At this time, the size of MAC PDU determined under the control of the transmission resource controller 130.

The upper layer device 150 can be any of Radio Link Control (RLC) device and Physical Downlink Control Protocol (PDCP) device. The PDCP device is a device in charge of compression/decompression of IP header, and the RLC device restructures the PDCP PDUs and is responsible for performing ARQ operation for reliable data transmission.

The radio resource controller 160 receives the information on the available size of MAC PDU and maximum number of resource blocks from the base station in a call setup process and transfers this information to the transmission resource controller 130.

Although not depicted in drawings, the user terminal according to an embodiment of the present invention is provided with a storage device for storing the received data. The storage device can store the data such as the table for saving the size of MAC PDU according to the codec rate, the valid MAC PDU size, and the maximum number of resource blocks. The user terminal also is provided with a decoding device for decoding the data and/or message related to specific protocol such as the PDCCH processor 120. For example, the user terminal can be provided with a device for decoding the data of a Radio Resource Control (RRC) protocol. The decoding device performs decoding on the data or message of the corresponding protocol among the data and messages received by the radio received connected to the RF unit 110.

A description is made of the radio resource allocation and the data transmission/reception method using the allocated resource in the wireless communication system according to an embodiment of the present invention.

Figure 4:
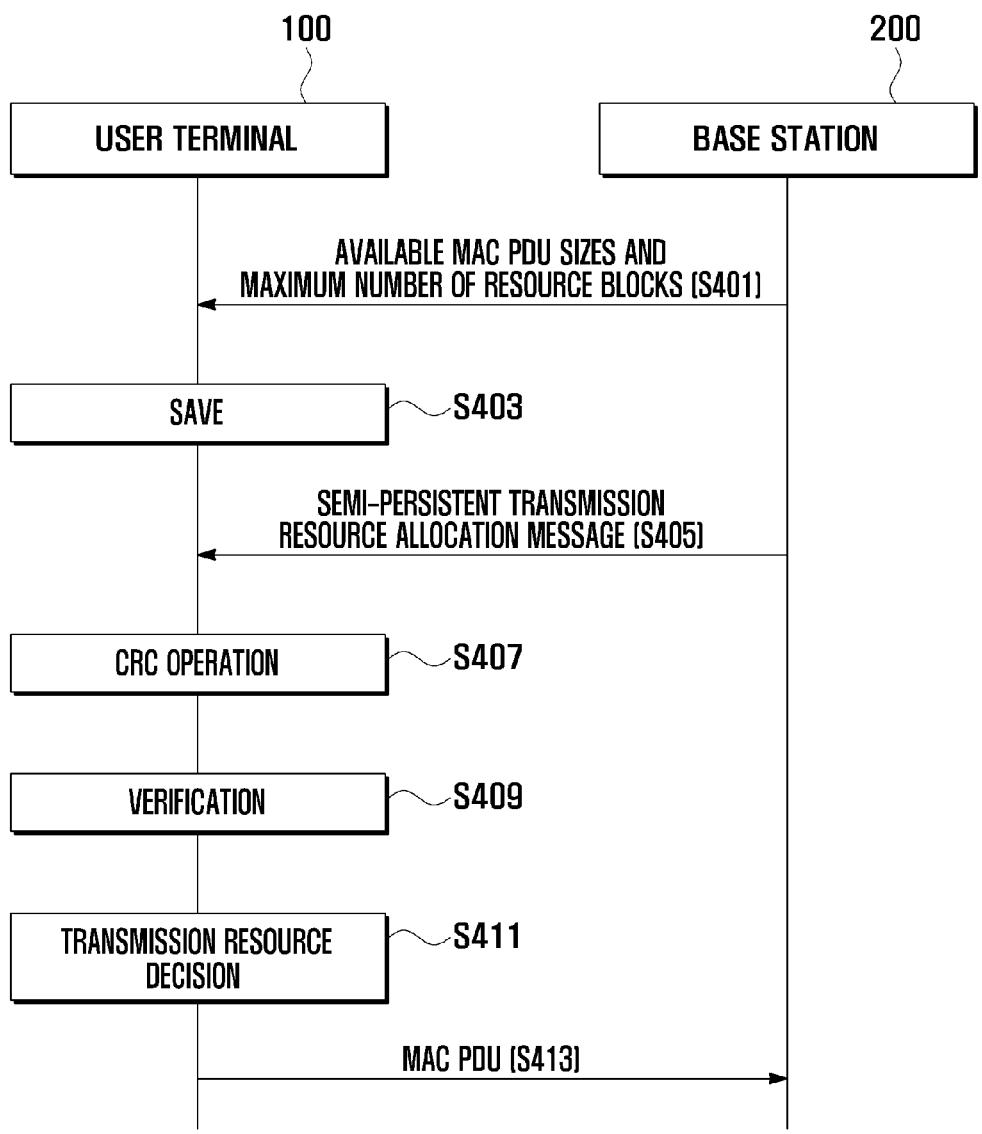
FIG. 4 is a signaling diagram illustrating the resource allocation method of the wireless communication system according to the first embodiment of the present invention.
Figure 5:
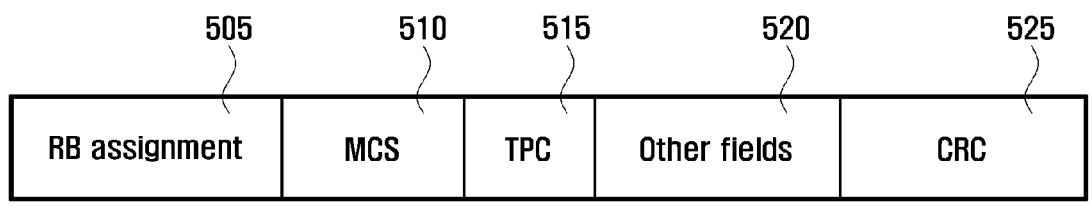
FIG. 5 is a diagram illustrating a format of the semi-persistent transmission resource allocation message according to an embodiment of the present invention.

FIG. 4 is a signaling diagram illustrating the resource allocation method of the wireless communication system according to the first embodiment of the present invention, and FIG. 5 is a diagram illustrating a format of the semi-persistent transmission resource allocation message according to an embodiment of the present invention.

The base station 200 transmits the information on the range or size such as a number or amount of semi-persistent resources to the user terminal 100 at step S401. This information is called "radio transmission resource information" hereinafter. The radio transmission resource information includes the available MAC PDU size and maximum number of resource blocks. The available MAC PDU size and maximum number of resource blocks are transmitted in the call setup process between the base station 200 and the user terminal 100.

The user terminal 100 receives the semi-persistent transmission resource allocation message and extracts the transmission resource information from the received semi-persistent transmission resource allocation message. The transmission resource information extracted from the semi-persistent transmission resource allocation message can include the MAC PDU size and number of resource blocks. Accordingly, the user terminal 100 can verify the validity of the semi-persistent transmission resource allocation message by comparing the MAC PDU size and number of resource blocks indicated by the semi-persistent transmission resource allocation message with the previously received available MAC PDU size and maximum number of resource block size.

The user terminal 100 stores, at step 403, the information on the available MAC PDU size and maximum number of resource blocks that is transmitted by the base station 200. In the call setup process, the base station 200 transmits the information on the available MAC PDU size and the maximum number of resource blocks to the user terminal 100 by means of Radio Resource Control (RRC) message, and the user terminal 100 analyzes the information by the radio resource control unit 160.

The available MAC PDU size can be a set of MAC PDU sizes or a range of MAC PDU sizes that the base station 200 can inform with the semi-persistent transmission resource allocation message. The available MAC PDU size can be expressed as a set of sizes, e.g. [size 1, size 2, . . . , size n], or as a range defined by minimum size and maximum size, e.g. [min size, max size]. The user terminal 100 verifies the CRC result according to the available MAC PDU size.

For example, if the semi-persistent transmission resource allocation message indicates a MAC PDU size different from the available MAC PDU size, the user terminal regards this message as the misrecognized erroneous message and ignores the corresponding semi-persistent transmission resource allocation message.

The maximum number of resource blocks denotes the maximum number of resource blocks that ban be allocated to the user terminal 100 with the semi-persistent transmission resource allocation message. The user terminal 100 can verify the CRC result using the maximum number of resource blocks. For example, if a number of resource blocks which is greater than the maximum number of resource block are allocated, the user terminals regards this message as the misrecognized erroneous message and ignores the corresponding semi-persistent transmissions resource allocation message.

Next, the base station 200 transmits the semi-persistent transmission resource allocation message to the user terminal 100 at step S405. Here, the semi-persistent transmission resource allocation message is transmitted on the Physical Downlink Control Channel (PDCCH). The semi-persistent transmission resource allocation message is protected by 16-bit CRC, and the PDCCH occupies maximum 3 OFDM symbols per 1 msec across the entire system bandwidth.

Particularly, the base station 200 transmits the semi-persistent transmission resource allocation message based on the available MAC PDU size and the maximum number of resource blocks transmitted at step S401. That is, the size of the resource to be allocated by means of the semi-persistent transmission resource allocation message has not to be out of the available MAC PDU size and the maximum number of the resource blocks.

Various formats of control message can be transmitted over PDCCH, and the user terminal 100 attempts decoding on all the types and formats of the control messages.

An exemplary format of the semi-persistent transmission resource allocation message is depicted in FIG. 5. The semi-persistent transmission resource allocation message includes an RB assignment field (505), a Modulation and Coding (MCS) field (510), a Tx Power Control (TPC) field (515), and a Cyclic Redundancy Checking (CRC) field. Here, reference number 520 denotes other fields, and detailed description thereon is omitted to avoid obscuring the subject matter of the present invention.

The RB assignment field 505 contains the information on the amount and location of the transmission resource to be used by the user terminal 100. The transmission resource is allocated in unit of Resource Block (RB) which is 1 msec long across a predetermined bandwidth, and at least one resource block is allocated by means of the RB assignment field 505. The MCS field 510 indicates the modulation schemed and channel coding rate for data transmission. The MCS field 510 is 5-bit long. The code point of the 5 bits is a combination of the modulation scheme and channel coding rate. For example, the MCS field 510 can carry the information indicating any of 32 code points for the combinations from a QPSK modulation and 0.11 channel coding rate pair to 64 QAM modulation and 0.95 channel coding rate pair. The TPC field 515 is a field for controlling the transmission power to be applied for the data transmission. Although there can be other fields in addition to the above described fields, detailed descriptions thereon are omitted herein. The CRC field 525 contains the information carried by the semi-persistent transmission resource allocation message and the CRC result to the C-RNTI for the semi-persistent transmission resource allocation.

As described above, if the semi-persistent transmission resource allocation message is received, the user terminal 100 determines whether the message is the semi-persistent transmission resource allocation message at step S407. The base station 200 can transmit the normal transmission resource allocation message and the semi-persistent transmission resource allocation message, and the base station 200 and the user terminal 100 use different identifiers (C-RNTI) to distinguish between the normal transmission resource allocation message and the semi-persistent transmission resource allocation message. The base station 200 performs masking on the semi-persistent transmission resource allocation message with the C-RNTI for semi-persistent transmission resource allocation message. Next, the base station 200 performs CRC operations and transmits the semi-persistent transmission resource allocation message containing the CRC result. In order to identify the semi-persistent transmission resource allocation message, the user terminal 100 performs masking on the received message with the C-RNTI for semi-persistent transmission resource allocation message. Next, the user terminal 100 performs CRC operation. If the CRC results are identical with each other, the user terminal 100 determines that the corresponding message is the semi-persistent transmission resource allocation message. Although the number of CRC operations attempted per 1 msec for verifying the semi-persistent transmission resource allocation message varies depending on the number of OFDM symbols for PDCCH transmission, it is about 20 times. For example, assuming that the CRC is 16-bit long, the false positive case can occur once among 65536 operations. The message passed the CRC test can be a misrecognized erroneous message. This means that there can be and error in verification of the semi-persistent transmission resource allocation message.

Accordingly, even when a message is judged as the semi-persistent transmission resource allocation message, there is a need for the user terminal 100 to verify the judgment result at step S409, i.e. whether the message is misrecognized erroneous message or not.

If it is determined that the message is not the misrecognized erroneous message, the user terminal 100 decides the semi-persistent transmission resource allocated with the semi-persistent transmission resource allocation message received at step S411.

Next, the user terminal 100 transmits the MAC PDUs in size indicated by the semi-persistent transmission resource allocation message at step S413. Since the user terminal 100 has to transmit the MAC PDUs to the base station 200 without exchange of separate control signals, the semi-persistent transmission resource allocation message decision must be accurate.

A description is made of a CRC operation result verification method of the user terminal hereinafter. The semi-persistent transmission resource is most useful for the Voice over IP (VoIP) service, and the MAC PDU for the VoIP service is limited in size. The present invention is conceived in this point. According to an embodiment of the present invention, the base station and the user terminal 100 limit the size of the MAC PDU available for transmission on the semi-persistent transmission resource to reduce the occurrence of misrecognized erroneous message and minimize, if occurs, the damage caused by the occurrence of the misrecognized erroneous message.

Figure 6:
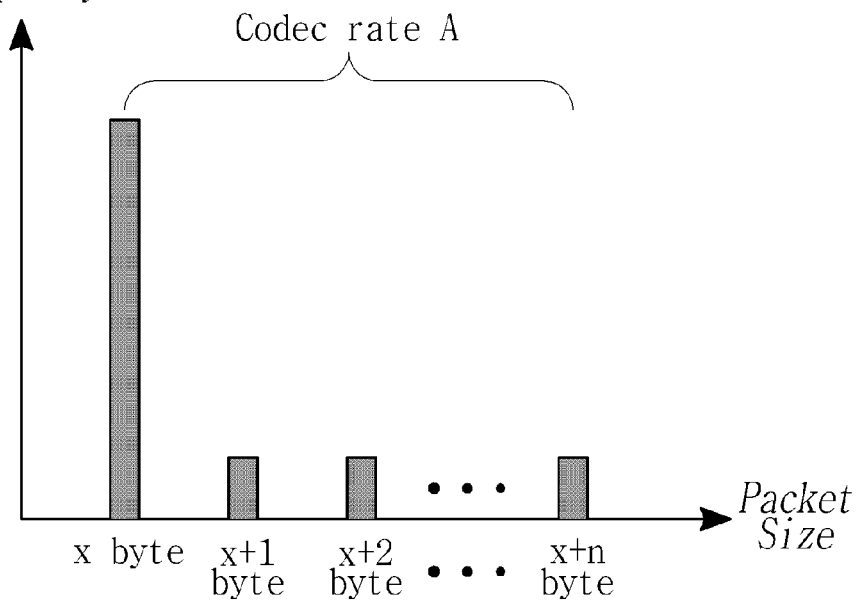
FIG. 6 is a drawing of graphs illustrating packet generation frequency in accordance with code type and codec rate according to an embodiment of the present invention.
Figure 6:
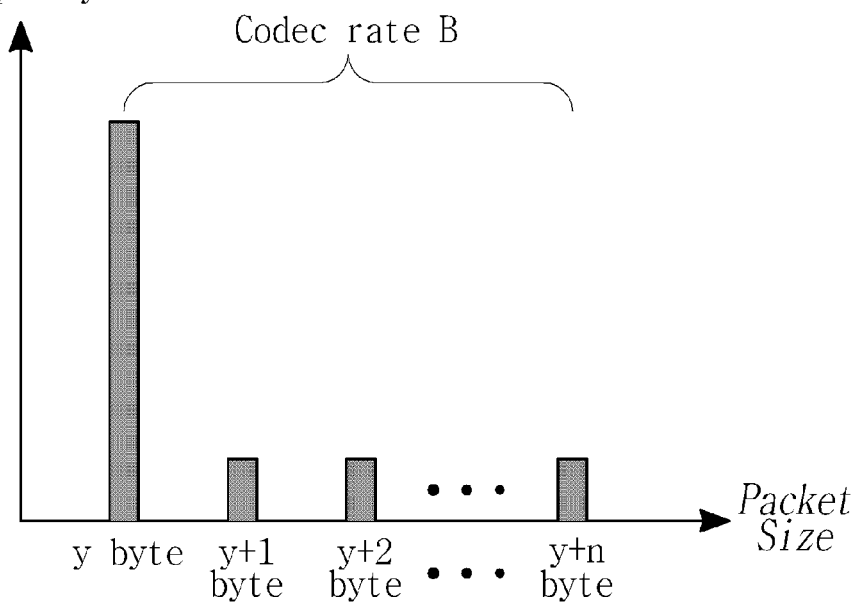

Typically, there is a slight tendency in which the VoIP packets having a compressed header are regular in size. This is explained with reference to FIG. 6. FIG. 6 is a drawing of graphs illustrating packet generation frequency in accordance with code type and codec rate according to an embodiment of the present invention.

As shown in graph (a) of FIG. 6, assuming that the minimum packet size is x bytes at a codec rate A; x-byte packets occur most frequently, packets which is a few bytes longer than x bytes occur less frequently, and packets which is much longer than x bytes occur least frequently. As shown in graph (b) of FIG. 6, assuming that the minimum packet size is y bytes at a codec rate B; y-byte packets occur most frequently, packets which is a few bytes longer than y bytes occur less frequently, and packets which is much longer than y bytes occur least frequently. If it is possible to know the type and rate of the codec to be used in the VoIP service in consideration of such traffic characteristics, the user terminal can anticipate the size of the MAC PDU carrying the VoIP packets.

In the wireless communication system according to an embodiment of the present invention, the size of MAC PDU to be carried on the semi-persistent transmission resource is limited in the call setup process, e.g. VoIP bearer setup process. Table 1 shows the sizes of MAC PDU that correspond to the codec rates according to an embodiment of the present invention.

TABLE 1

| Codec rate | Typical MAC PDU size |
| --- | --- |
| 4.75 kbps | 16 byte, 17 byte, 20 byte |
| 5.15 kbps | 17 byte, 18 byte, 21 byte |
| 5.90 kbps | 19 byte, 20 byte, 23 byte |
| 6.70 kbps | 21 byte, 22 byte, 25 byte |
| 7.40 kbps | 23 byte, 24 byte, 27 byte |
| 7.95 kbps | 24 byte, 25 byte, 28 byte |
| 10.2 kbps | 30 byte, 31 byte, 34 byte |
| 12.2 kbps | 35 byte, 36 byte, 39 byte |

The frequently occurring MAC PDU sizes per codec rate with NB-AMR codec are shown in table 1. Accordingly, when setting up the bearer for the VoIP with NB-AMR codec, the sizes of MAC PDUs to be transmitted on the semi-persistent transmission resource is limited to the sizes as shown in table 1.

That is, the base station 200 determines the available MAC PDU size based on the MAC PDU size occurring per type and rate of codec as shown in table 1 and notifies the user terminal with the available MAC PDU. Accordingly, when the MAC PDU size indicated in the semi-persistent transmission resource allocation message is not any of the available MAC PDU sizes, the user terminal 100 discards the corresponding message. That is, the CRC result is verified. Also, the CRC result verification can be performed by restricting the number of RBs as using the MAC PDU size. According to an embodiment of the present invention, it is possible to reduce the probability of occurrence of the misrecognized erroneous message through the verification process.

As described at step S401, in order to restrict the size of MAC PDU and the number of resource blocks, the base station 200 notifies the user terminal 100 of the available MAC PDU sizes and the maximum number of resource blocks.

In order to verify the CRC operation result, the user terminal 100 compares the available MAC PDU sizes and maximum number of resource blocks with the extracted MAC PDU size and number of resource blocks, respectively.

The user terminal 100 refers to the semi-persistent transmission resource allocation message and calculates the size of MAC PDU to be transmitted on the semi-persistent transmission resource using Equation (1):

$$\text{MAC PDU size} = n*z*Y*\text{number of bits per resource block}. \quad \text{Equation (1)}$$

In Equation (1), n denotes a number of resource blocks, z denotes a modulation scheme, and y denotes a channel coding rate. Referring to the semi-persistent transmission resource allocation message, n can be obtained by referencing the RB assignment field 505, and the z and y can be obtained by referencing the MCS field 510. The variable z is 2 in QPSK, 4 in 16 QAM, and 6 in 64 QAM. A number of bits that can be transmitted in a single resource block is preset.

Although the size of MAC PDU corresponding to the number of allocated resource blocks and MCS information can be obtained using a predetermined equation, a value negotiated between the user terminal 100 and the base station 200 can be used according to another embodiment of the present invention.

Although there are a few thousand combinations of the number allocated transmission resource and MCS information, large number of combinations indicate the same MAC PUD size, and thus the indicative number of MAC PDU sizes is about 180. For example, the MAC PDU sizes that are frequently occurring in the NB-AMR as exemplary shown in table 1 is in the range of 16 to 39 bytes and, since the sizes among the entire MAC PDU sizes that are in that range is about 10, if restricting the range of the MAC PDU size between 16 bytes and 39 bytes, it is possible to reduce the occurrence probability of the misrecognized erroneous semi-persistent transmission resource allocation message to $\frac{1}{18}$.

Figure 7:
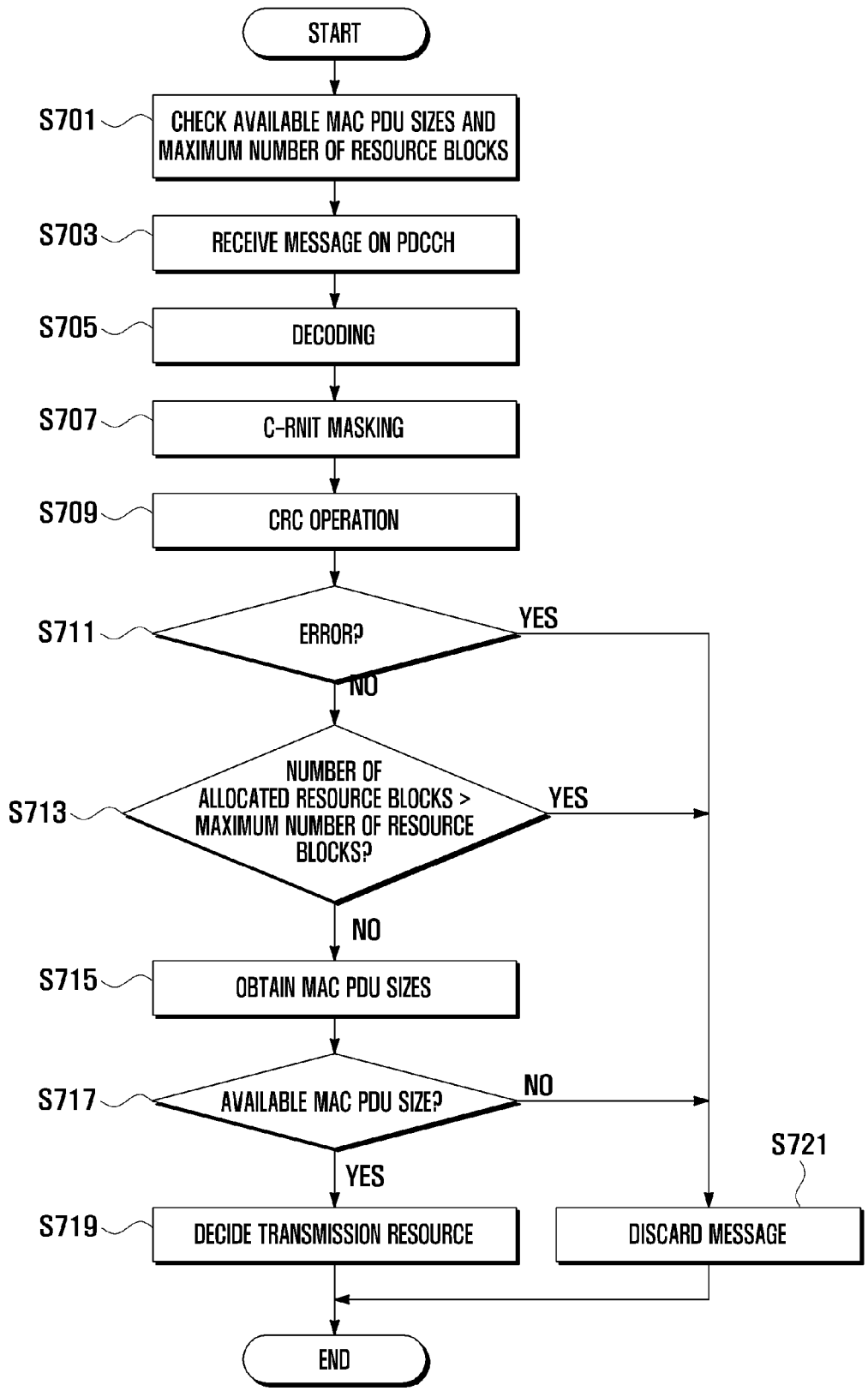
FIG. 7 is a flowchart illustrating a resource allocation method according to the first embodiment of the present invention.

Also, the number of resource blocks can be obtained from the semi-persistent transmission resource allocation message. FIG. 7 is a flowchart illustrating a resource allocation method according to the first embodiment of the present invention.

Referring to FIG. 7, the user terminal 100 acquires the information on the amount of the semi-persistent transmission resource through a call setup process at step S701. Here, the information on the amount of semi-persistent transmission resource includes the available MAC PDU sizes and the maximum number of resource blocks. The information on the available MAC PDU sizes and the maximum number of resource blocks are transmitted in the call setup process between the base station 200 and the user terminal 100. That is, the user terminal 100 receives and stores the information on the available MAC PDU sizes and the maximum number of resource blocks in the call setup process. Here, the available MAC PDU sizes can be expressed in the form of a set or a rage of MAC PDU sizes. The MAC PDU sizes are expressed as a set of individual MAC PDU sizes, e.g. [size 1, size 2, . . . , size n] or as a range with a minimum size and a maximum size, e.g. [min size, max size].

The user terminal 100 verifies the CRC result according to the available MAC PDU sizes. In an exemplary case where the MAC PDU size indicated by the semi-persistent transmission resource allocation message differs from the available MAC PDU sizes, the user terminal regards this message as the misrecognized erroneous message and ignores the corresponding semi-persistent transmission resource allocation message.

The maximum number of resource blocks is the maximum number of resource blocks that can be allocated to the user terminal 100 with the semi-persistent transmission resource allocation message. If the number of resource blocks allocated by the semi-persistent transmission resource allocation message is greater than the maximum number of resource blocks, the user terminal 100 regards the message as the misrecognized erroneous message and ignores the semi-persistent transmission resource allocation message.

The base station 200 transmits the information on the available MAC PDU sizes and the maximum number of resource blocks to the user terminal 100 by means of the RRC message, and the user terminal 100 acquires the information by means of the wireless resource control unit 160.

After completing the call setup process, the user terminal 100 receives the message on the PDCCH at step S703 and performs decoding on the received message according a predetermined method at step S705.

The user terminal 100 performs masking on the decoded message with the C-RNTI for semi-persistent transmission resource allocation message at step S707 and performs CRC operation on the message masked with the C-RNTI at step S709. Next, the user terminal 100 determines whether there is an error in the CRC operation result at step S711. If it is determined that there is an error in the CRC operation result, the user terminal 100 regards that the message is not destined to itself and discards the message with ignorance of its content. If it is determined that there is no error in the CRC operation result, the procedure goes to step S713.

At step S713, the user terminal 100 determines whether the number of resource blocks indicated by the message is greater than the maximum number of resource blocks (checked previously at step S701) to verify the CRC operation result at step S713. If the number of resource blocks is greater than the maximum number of resource blocks, this means that the message is the misrecognized erroneous message, and thus the user terminal 100 discards the corresponding message with ignorance of the its content at step S721.

If the number of resource blocks is not greater than the maximum number of resource blocks, the user terminal 100 checks the MAC PDU size at step S715. The MAC PDU size can be calculated using the transmission resource allocation information and MCS information contained in the received semi-persistent transmission resource allocation message.

Next, the user terminal 100 determines whether the checked MAC PDU size is one of the available MAC PDU sizes at step S717. If the checked MAC PDU size is not one of the available MAC PDU sizes, the user terminal 100 determines that the misrecognized erroneous message is received, and thus discards the corresponding message with ignorance of its content at step S721.

Otherwise, if the checked MAC PDU size is one of the available MAC PDU sizes, the user terminal 100 determines that the correct semi-persistent transmission resource allocation message is received, and thus decides the semi-persistent transmission resource indicated by the semi-persistent transmission resource allocation message at step S719 and transmits the uplink data on the semi-persistent transmission resource arriving periodically.

As described above, the CRC result verification process is performed according to an exemplary embodiment of the present invention. In the above described embodiment, the verification is performed with two parameters including available MAC PDU sizes and the maximum number of resource blocks. However, the verification can be performed with one of the parameters. That is, one of the resource block-based verification step (S713) and the MAC PDU size-based verification steps (S715 and S717) can be omitted. Also, it is possible to perform the available MAC PDU sizes-based verification step followed by the maximum number of resource blocks-based verification step. That is, steps S715 and S717 can be followed by step S713.

A description is made of the transmission resource allocation method according to the second embodiment of the present invention. The normal semi-persistent transmission resource includes the resource for retransmission. Accordingly, the transmission resource for retransmission is not allocated separately. According to the second embodiment of the present invention, however, the user terminal is allocated a separate transmission resource to retransmit the first packet transmitted on the semi-persistent transmission resource indicated by the semi-persistent transmission resource allocation message. Accordingly, in case that the semi-persistent transmission resource allocation message received from the base station 200 is not destined to the user terminal 100 itself, the user terminal 100 cannot be allocated the transmission resource for retransmission. If no resource for retransmission is allocated, the user terminal 100 determines regards the correctly received semi-persistent transmission resource allocation message as a misrecognized erroneous message.

The aforementioned packet retransmission can be performed with an Automatic Retransmission Request (ARQ) and/or Hybrid-ARQ (HARQ). In more detail, after transmitting the semi-persistent transmission resource allocation message, the base station 200 can transmit a separate transmission resource allocation message for the HARQ retransmission of the first packet (unlike other HARQ retransmission or initial transmission).

Meanwhile, if it is required to retransmit the first packet after transmitting the first packet on the semi-persistent transmission resource indicated by the semi-persistent transmission resource allocation message, and if a retransmission resource allocation message is received from the base station 100, the user terminal 100 determines that the semi-persistent transmission resource allocation message is the correct one but not the misrecognized erroneous message so as to use the allocated semi-persistent transmission resource continuously.

This retransmission method entails a response to the retransmission. That is, if the HARQ retransmission is valid, the base station 100 transmits an acknowledgement (ACK). If the ACK is received, the user terminal 200 determines that the corresponding semi-persistent transmission resource allocation message is valid.

Figure 8:
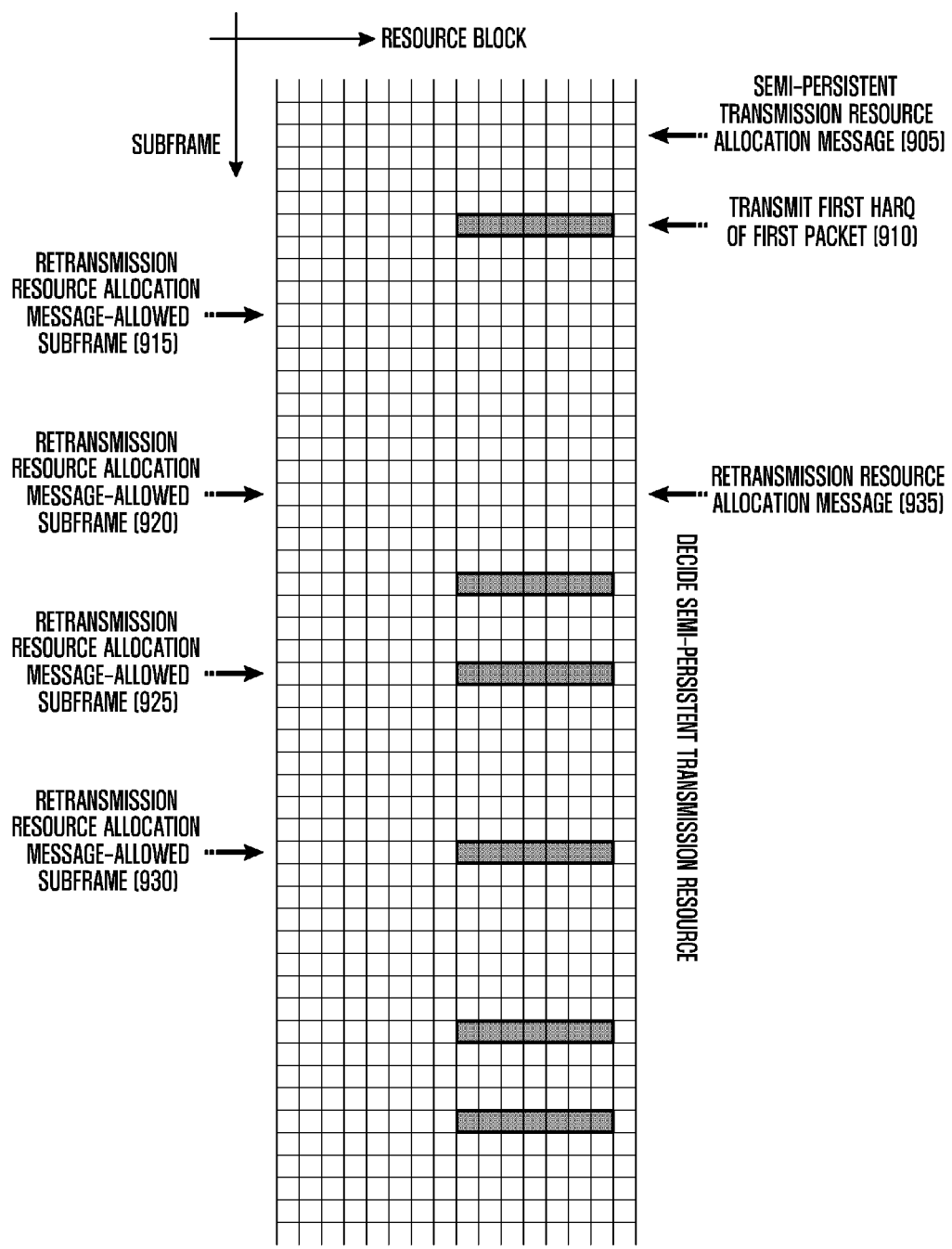
FIG. 8 is a diagram illustrating a transmission resource allocation method according to the second embodiment of the present invention.

A description is made of the method according to the second embodiment of the present invention with reference to accompanying drawings. FIG. 8 is a diagram illustrating a transmission resource allocation method according to the second embodiment of the present invention. FIG. 8 shows a structure of a frame used as transmission resource. In FIG. 8, the frame is divided into a plurality of subframes, and each subframe is divided into a plurality of Resource Blocks (RBs). Here, it is assumed that the semi-persistent transmission resource occurs at every 20 subframes and HARQ Round Trip Time (RTT) is eight subframes.

Referring to FIG. 8, if the semi-persistent transmission resource allocation message is received at a time point, the user terminal 100 checks the transmission resource indicated by the semi-persistent transmission resource allocation message. Next, the user terminal 100 performs first HARQ retransmission of the first packet using the allocated transmission resource. Next, the user terminal 100 determines whether a retransmission resource allocation message is received in a subframe which is allowed for transmitting an HARQ retransmission resource allocation message. The HARQ retransmission resource is allocated by means of the normal transmission resource allocation message with the field containing a value indicating the retransmission resource allocation. The subframes allowed for transmitting the retransmission resource allocation message are the subframes (915 to 930) arranged at an interval of integer multiple of the HARQ RTT at the time point 905 when the initial transmission resource allocation message is received. Although the semi-persistent transmission resource is allocated, the user terminal does not judge that the semi-persistent transmission resource allocation message is correct and use the semi-persistent transmission resource indicated by the semi-persistent transmission resource allocation message until the following two conditions are fulfilled. That is, if an HARQ ACK to the transmission of the first packet on the semi-persistent transmission resource is received, or if a retransmission resource allocation message to the transmission of the first packet is not received, the user terminal 100 judges that the semi-persistent transmission resource is not verified.

If a valid retransmission resource allocation message is received in the subframe 935, the user terminal confirms the allocation of the semi-persistent transmission resource at that time and starts using the allocated semi-persistent transmission resource.

If it is determines that the semi-persistent transmission resource allocation message received in the subframe 905 is the misrecognized erroneous message, the base station does not transmit HARQ ACK or retransmission resource allocation message to the user terminal 100. Since the user terminal 100 does not use the semi-persistent transmission resource but for the first HARQ retransmission of the first packet, it is possible to minimize transmission resource waste caused by the misrecognized erroneous message.

Figure 9:
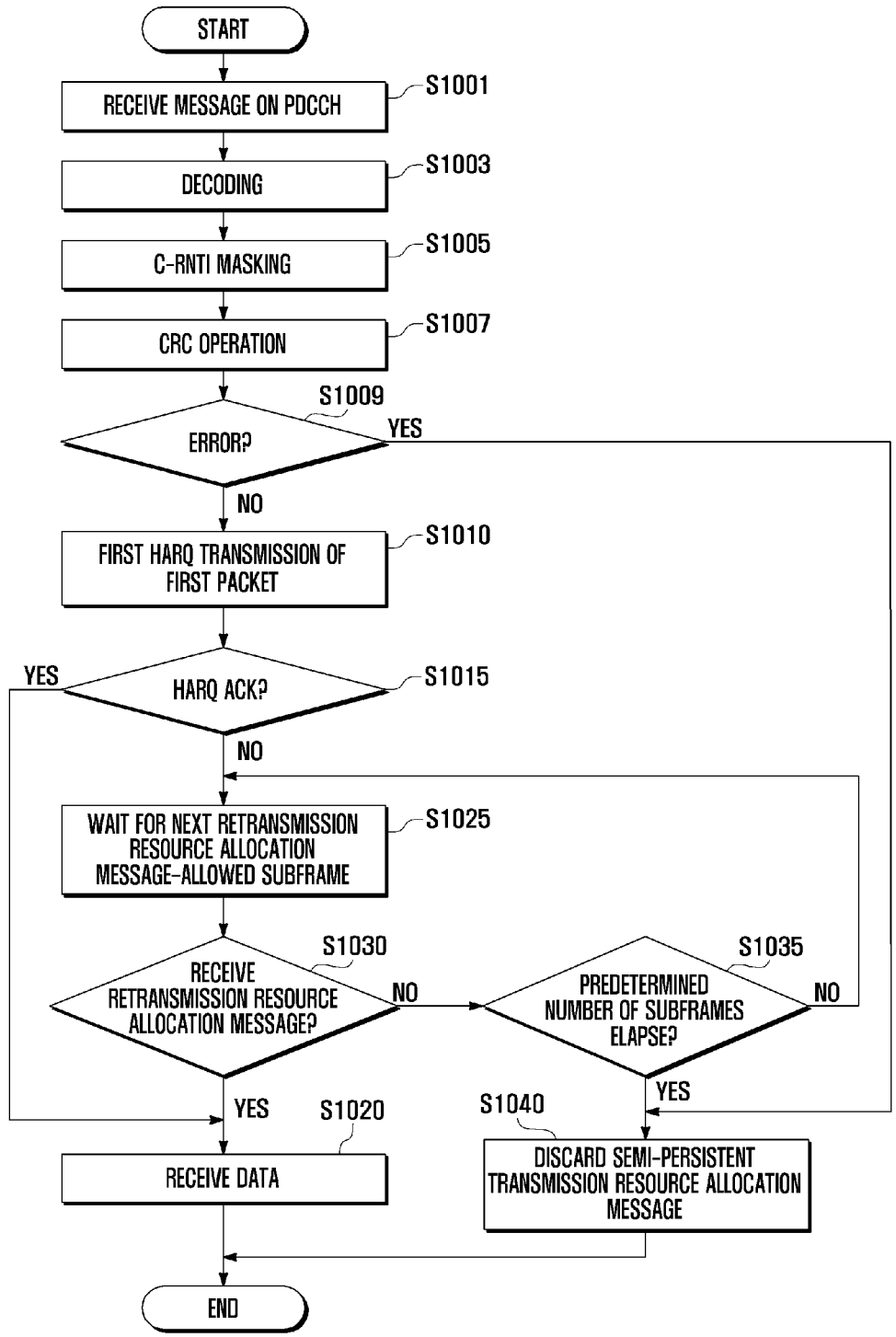
FIG. 9 is a flowchart illustrating a transmission resource allocation method according to the second embodiment of the present invention.

FIG. 9 is a flowchart illustrating a transmission resource allocation method according to the second embodiment of the present invention. Referring to FIG. 8, the user terminal 100 receives a message on the PDCCH at step S1001 and decodes the message at step S1003. Next, the user terminal 100 performs masking the decoded message with a C-RNTI for semi-persistent transmission resource allocation message at step S1005 and performs CRC operation on the message masked with the C-RNTI at step S1007. Next, the user terminal 100 determines whether there is an error in the CRC operation result at step S1009. If there is an error in the CRC operation result, the user terminal 100 determines that the message is not destined to itself so as to discard the message with ignorance of its content. Otherwise, if there is no error in the CRC operation result, the procedure goes to step S1010. At step S1010, the user terminal 100 attempts first HARQ transmission of the first packet using the transmission resource after x Transmission Time Interval (TTI). Next, the user terminal 100 determines whether an HARQ ACK to the HARQ transmission at step S1015 and, if the HARQ ACK is received, the procedure goes to step S1020 and, otherwise, step S1025. If the HARQ ACK to the data transmitted on the allocated transmission resource, this means that the base station has received the uplink data successfully and the transmission resource used for the data transmission is valid, such that the user terminal 100 decides the semi-persistent transmission resource allocated with the received semi-persistent transmission resource allocation message and transmits uplink data on the semi-persistent transmission resource arriving periodically.

At step S1025, the user terminal 100 waits for the next 'retransmission resource allocation message-allowed subframe'. As aforementioned, the 'retransmission resource allocation message-allowed subframes' are the subframes (915, 920, 925, and 930) transmitted at an interval of integer multiple of HARQ RTT from the time point when the semi-persistent transmission resource allocation message is received. In FIG. 8, the interval is 8 subframes.

Next, the user terminal 100 determines whether the retransmission resource allocation message is received in the subframes (915, 920, 925, and 930) at step S1030. If the retransmission resource allocation message is received, the user terminal 100 decides the semi-persistent resource at step S1020. For example, if a retransmission resource allocation message is received in one of the retransmission resource allocation message-allowed subframes (915, 920, 925, and 930), the user terminal 100 decides the semi-persistent transmission resource indicated by the semi-persistent transmission resource allocation message. In exemplary case of FIG. 8, the retransmission resource allocation message 935 is received in the subframe 920.

If the retransmission resource allocation message is not received at step S1030, the user terminal 100 does not use the allocated semi-persistent transmission resource, and the procedure goes to step S1035.

At step S1035, the user terminal 100 determines whether a predetermined number of 'retransmission resource allocation message-allowed subframes' has elapsed. If a predetermined number of 'retransmission resource allocation message-allowed subframes' has elapsed, the procedure goes to step S1040 and, otherwise, step S1025. At step S1040, the user terminal 100 determines that the semi-persistent transmission resource allocation message is the misrecognized erroneous message and discards the semi-persistent transmission resource allocation message with ignorance of its content.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of a terminal, comprising:
   receiving available transmission resource information;
   receiving a semi-persistent transmission resource allocation message including transmission resource information;
   performing cyclic redundancy checking (CRC) operation on the semi-persistent transmission resource allocation message;
   verifying, if the CRC operation succeeds, validity of the semi-persistent transmission resource allocation message by comparing the transmission resource information included in the semi-persistent transmission resource allocation message with the available transmission resource information; and
   transmitting, if the validity of the semi-persistent transmission resource allocation message is verified, data using the transmission resource information included in the semi-persistent transmission resource allocation message,
   wherein verifying validity of the semi-persistent transmission resource allocation message comprises:
      transmitting an HARQ message for a first packet on a transmission resource included in the transmission resource information; and
      identifying whether to receive an HARQ ACK or a retransmission resource allocation message, in response to the HARQ message for the first packet.

2. The method of claim 1, wherein the available transmission resource information includes at least one of available MAC PDU sizes and maximum number of resource blocks.

3. The method of claim 2, wherein verifying validity of the semi-persistent transmission resource allocation message comprises:
   determining whether a MAC PDU size included in the transmission resource information is equal to one of the MAC PDU sizes included in the available transmission resource information.

4. The method of claim 2, wherein verifying validity of the semi-persistent transmission resource allocation message comprises:
   determining whether a number of resource blocks included in the transmission resource information is less than the maximum number of resource blocks included in the available transmission resource information.

5. The method of claim 1, further comprising discarding, if the CRC operation fails, the semi-persistent transmission resource allocation message.

6. A terminal, comprising:
   a transceiver configured to transmit and receive signals; and
   at least one processor configured to:
      control the transceiver to receive available transmission resource information,
      control the transceiver to receive a semi-persistent transmission resource allocation message including transmission resource information,
      perform cyclic redundancy checking (CRC) operation on the semi-persistent transmission resource allocation message,
      verify, if the CRC operation succeeds, validity of the semi-persistent transmission resource allocation message by comparing the transmission resource information included in the semi-persistent transmission resource allocation message with the available transmission resource information, and
      control the transceiver to transmit, if the validity of the semi-persistent transmission resource allocation message is verified, data using the transmission resource information included in the semi-persistent transmission resource allocation message,
   wherein the at least one processor is configured to verify the validity of the semi-persistent transmission resource allocation message by:
      transmitting an HARQ message for a first packet on a transmission resource included in the transmission resource information, and identifying whether to receive an HARQ ACK or a retransmission resource allocation message, in response to the HARQ message for the first packet.

7. The terminal of claim 6, wherein the available transmission resource information includes at least one of available MAC PDU sizes and maximum number of resource blocks.

8. The terminal of claim 7, wherein the at least one processor is further configured to verify the validity of the semi-persistent transmission resource allocation message depending on whether a MAC PDU size included in the transmission resource information is equal to one of the MAC PDU sizes included in the available transmission resource information.

9. The terminal of claim 7, wherein the at least one processor is further configured to verify the validity of the semi-persistent transmission resource allocation message depending on whether a number of resource blocks included in the transmission resource information is less than the maximum number of resource blocks of the available transmission resource information.

10. The terminal of claim 6, wherein the at least one processor is further configured to discard, if an error is in CRC operation result, the semi-persistent transmission resource allocation message.

* * * * *